US010618334B2

(12) United States Patent
Costin, Sr. et al.

(10) Patent No.: US 10,618,334 B2
(45) Date of Patent: *Apr. 14, 2020

(54) HIGH SPEED AND HIGH POWER LASER SCRIBING METHODS AND SYSTEMS

(71) Applicant: RevoLaze, LLC, Westlake, OH (US)

(72) Inventors: Darryl J. Costin, Sr., Avon Lake, OH (US); Darryl J. Costin, Jr., Bay Village, OH (US); Kimberly L. Ripley, Avon, OH (US)

(73) Assignee: RevoLaze, LLC, Westlake, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/877,963

(22) Filed: Jan. 23, 2018

(65) Prior Publication Data
US 2018/0229527 A1    Aug. 16, 2018

Related U.S. Application Data

(63) Continuation of application No. 15/181,827, filed on Jun. 14, 2016, now Pat. No. 9,873,277, which is a
(Continued)

(51) Int. Cl.
*B23K 26/00* (2014.01)
*B44C 1/22* (2006.01)
(Continued)

(52) U.S. Cl.
CPC ............. *B41M 5/24* (2013.01); *B23K 26/082* (2015.10); *B29C 59/16* (2013.01); *B44C 1/228* (2013.01);
(Continued)

(58) Field of Classification Search
CPC ...... B23K 26/36; B23K 26/365; B23K 26/38; B23K 26/4025; B23K 26/4035
(Continued)

(56) References Cited

U.S. PATENT DOCUMENTS 3,720,784 A  3/1973 Maydan et al.
3,789,421 A  1/1974 Chivian et al.
(Continued)

FOREIGN PATENT DOCUMENTS

DE  3916126 A1  11/1990
EP  1123772 A1  8/2001
(Continued)

OTHER PUBLICATIONS

Compaan et al, "Optimization of Laser scribing for Thin Film PV Modules", Annual technical Progress Report Apr. 12, 1995-Apr. 11, 1996, Oct. 1996.
(Continued)

*Primary Examiner* — Hsien Ming Lee
(74) *Attorney, Agent, or Firm* — Berenato & White, LLC

(57) ABSTRACT

A method of scribing a graphic on a material is provided, in which laser output is applied to the material. The laser output is moved relative to the material at a high speed greater than 10 m per second, and at a high power greater than 500 W, to scribe a graphic on a surface of the material. Also provided is a system for scribing a graphic on a material. The method and system of the invention are especially useful in the scribing of building materials.

19 Claims, 2 Drawing Sheets

Related U.S. Application Data continuation of application No. 14/586,097, filed on Dec. 30, 2014, now Pat. No. 9,364,920, which is a continuation of application No. 12/664,116, filed as application No. PCT/US2008/007316 on Jun. 12, 2008, now Pat. No. 8,921,732.

(60) Provisional application No. 60/952,431, filed on Jul. 27, 2007, provisional application No. 60/943,317, filed on Jun. 12, 2007.

(51) Int. Cl.

| | | |
|---|---|---|
| *B41M 5/24* | (2006.01) | |
| *C03C 23/00* | (2006.01) | |
| *B29C 59/16* | (2006.01) | |
| *C03B 33/10* | (2006.01) | |
| *B23K 26/082* | (2014.01) | |
| *B41M 5/26* | (2006.01) | |

(52) U.S. Cl.
CPC ........ *C03B 33/102* (2013.01); *C03C 23/0025* (2013.01); *B41M 5/26* (2013.01)

(58) Field of Classification Search
USPC .............. 219/121.6, 121.61, 121.68, 121.69, 219/121.85
See application file for complete search history.

(56) References Cited

U.S. PATENT DOCUMENTS

| | | | |
|---|---|---|---|
| 4,024,545 A | 5/1977 | Dowling et al. | |
| 4,468,551 A | 8/1984 | Neiheisel | |
| 4,535,218 A | 8/1985 | Krause et al. | |
| 4,629,858 A | 12/1986 | Kyle | |
| 4,847,184 A | 7/1989 | Taniguchi et al. | |
| 4,861,620 A | 8/1989 | Azuma et al. | |
| 4,947,022 A | 8/1990 | Ostroff et al. | |
| 5,017,423 A | 5/1991 | Bossmann et al. | |
| 5,075,195 A | 12/1991 | Baebler et al. | |
| 5,171,450 A | 12/1992 | Hoots | |
| 5,171,650 A | 12/1992 | Ellis et al. | |
| 5,185,511 A | 2/1993 | Yabu | |
| 5,200,592 A | 4/1993 | Yabu | |
| 5,567,207 A † | 10/1996 | Lockman | |
| 5,759,727 A | 6/1998 | Malhotra | |
| 5,817,243 A † | 10/1998 | Shaffer | |
| 5,990,444 A | 11/1999 | Costin | |
| 6,140,602 A | 10/2000 | Costin | |
| 6,231,196 B1 | 5/2001 | Mahachek | |
| 6,252,196 B1 | 6/2001 | Costin et al. | |
| 6,315,202 B2 | 11/2001 | Costin et al. | |
| 6,495,237 B1 | 12/2002 | Costin | |
| 6,576,862 B1 | 6/2003 | Costin et al. | |
| 6,633,422 B2 | 10/2003 | Karasaki et al. | |
| 6,664,505 B2 | 12/2003 | Martin | |
| 6,685,868 B2 | 2/2004 | Costin | |
| 6,706,320 B2 | 3/2004 | Filippou et al. | |
| 6,753,501 B1 | 6/2004 | Costin, Sr. et al. | |
| 6,807,456 B1 | 10/2004 | Costin, Jr. et al. | |
| 6,819,972 B1 | 11/2004 | Martin et al. | |
| 6,822,192 B1 | 11/2004 | Young | |
| 6,858,815 B1 | 2/2005 | Costin | |
| 6,885,868 B1 | 4/2005 | Naim et al. | |
| 7,699,896 B1 | 4/2010 | Colwell | |
| 8,071,912 B2 | 12/2011 | Costin, Sr. et al. | |
| 8,921,372 B2 * | 12/2014 | McKinnell ........... | C07D 403/14 514/253.09 |
| 8,921,732 B2 | 12/2014 | Costin et al. | |
| 9,364,920 B2 | 6/2016 | Costin et al. | |
| 9,873,277 B2 * | 1/2018 | Costin, Sr. .............. | B44C 1/228 |
| 2002/0179580 A1 | 12/2002 | Costin | |
| 2002/0198622 A1 † | 12/2002 | Dinauer | |
| 2005/0151302 A1 | 7/2005 | Latos et al. | |
| 2007/0029289 A1 | 2/2007 | Brown | |
| 2007/0108170 A1 † | 5/2007 | Costin, Sr. | |

FOREIGN PATENT DOCUMENTS

| | | |
|---|---|---|
| GB | 2294656 A | 5/1996 |
| JP | 1-95885 A | 4/1989 |
| JP | 3-45578 A | 2/1991 |
| JP | 5-138374 A | 6/1993 |
| JP | 08-187582 A | 7/1996 |
| JP | 11-060376 A | 3/1999 |
| JP | 2002-028798 A | 1/2002 |
| JP | 2002-121618 A | 4/2002 |
| JP | 2004-520942 A | 7/2004 |
| JP | 2004-342494 A | 12/2004 |
| WO | 9322944 A1 | 11/1993 |
| WO | 2004084423 A2 | 9/2004 |

OTHER PUBLICATIONS

Opposition against corresponding Indian Patent Application No. 8196/DELNP/2009 Under Section 25(1) signed Feb. 8, 2019.
R.C. Oehrle, "Galvanometer beam-scanning system for laser fiber drawing", Applied Optics vol. 18, Issue 4, pp. 496-500.
Scholles et al, "Ultra compact laser projection systems based on two-dimensional resonant micro scanning mirrors", Proceedings of SPIE—The International Society for Optical Engineering, vol. 6466, Jan. 20, 2007, Art. No. 54660A, pp. 64660A-1-64660A-12.

\* cited by examiner
† cited by third party

HIGH SPEED AND HIGH POWER LASER SCRIBING METHODS AND SYSTEMS

CROSS-REFERENCE TO RELATED APPLICATIONS AND CLAIM TO PRIORITY

This application is a continuation of application Ser. No. 15/181,827 filed Jun. 14, 2016, now U.S. Pat. No. 9,873,277, which is a continuation of application Ser. No. 14/586,097 filed Dec. 30, 2014, now U.S. Pat. No. 9,364,920, which is a continuation of application Ser. No. 12/664,116 filed Dec. 11, 2009, now U.S. Pat. No. 8,921,732, which is a National Phase of International Application No. PCT/US2008/007316 filed Jun. 12, 2008, and also claims the benefit of priority of provisional applications 60/943,317 filed Jun. 12, 2007 and 60/952,431 filed Jul. 27, 2007, the disclosures of which are herewith incorporated by reference in their entireties.

FIELD OF THE INVENTION

The invention generally relates to a laser-based method and system for scribing graphics on materials, especially building materials, at high processing rates suitable for industrial scale manufacturing.

BACKGROUND OF THE INVENTION

Residential and commercial building products include interior building products such as drywall, countertops, bathroom fixtures, kitchen cabinets, interior doors, flooring, wall panels, ceiling tiles, and building exterior products such as decking, siding, trim, fencing, windows and exterior doors. These products are made of gypsum, vinyl, acrylic, hardboard, tempered glass, annealed glass, resin composites, various laminates, veneer, low profile carpet tiles, fiberglass, ceramic, granite, plastic and plastic wood composites, and a variety of other materials. There is often a desire to offer such components in decorative fashion with various graphic designs imprinted on the materials.

Conventional printing technologies such as embossing and ink-jet printing often produce unappealing aesthetics. Other processes such as sandblasting and veneering have the drawback of high cost.

It would seem that laser engraving building products would offer an attractive means to decorate building products. However, commercial production lasers have not been used to decorate building products in a large scale production at economically attractive rates. It is believed that at least two factors explain why building products are not laser etched on a mass production scale. These factors are the relatively low scan speeds and relatively low power capabilities of commercial laser engraving systems.

With regard to scan speeds, a laser beam can be driven with linear motors or lead screw drives on x-y tables at typical laser scan speeds of typically 0.5 to 3.0 meters per second. This method is common in the laser cutting industry which uses 1,000-10,000 watt lasers to cut steel, for example. Companies such as Amada®, Trumph, Rofin®, Fanuc®, and Panasonic® provide such 1,000-10,000 watt laser systems.

The speeds of these conventional linear-motor-driven laser systems would take several total processing minutes just to etch a square foot of material. For example, a recent advertisement of a leading laser system, Vyteck L-Star, purports that it is the "world's fastest laser system for the stone, tile and glass industries". The advertisement further purports that the "L-Star outperforms the competition with engraving speeds up to 150 ips" or 3.8 meters per second.

The inventors recognized, however, that the speeds obtained by conventional linear-motor systems would not allow economical scribe-processing of building products because it would take far too long to decorate a substrate. It is estimated that a laser of this linear-motor type would take several minutes per square foot to etch graphic patterns on building materials. For example, at this speed, it is estimated that it could take about 6 minutes to etch a complex graphic pattern on a square foot of medium density fiberboard, a common substrate for building materials. Thus, the unit manufacturing costs would be far too high to economically process such building materials on a mass scale. The slow speed of this linear motor would likely not be a practical or economical method to lase graphic patterns on wood composite decking, flooring, wood composite products or any other typical building product substrate at high volumes. It could take several minutes per square foot to lase complex wood grain patterns on a square foot of engineered wood or plastic lumber with current laser engraving technology. The inventors believe that this is why such building materials are not laser etched in high volumes.

Alternatively, galvanometer-driven mirrors (or galvo mirrors for short) can be used to control the movement of a laser beam on the surface of a material. The galvo mirrors are moved by a control signal, and that movement correspondingly causes the output beam of the laser to be moved on the material along a desired path, thereby enabling creation of a pattern. This method finds wide application in the laser engraving of a variety of materials including steel, wood and plastic, using 50-250 watt lasers.

Laser systems driven by galvo mirrors are employed on relatively small scales (generally less than 61 cm (or two feet) square field size) and at low speeds (less than 5 meters per second engraving speed) with low power (generally between 50-250 watts). These systems typically etch products such as wine glasses, small brass bushings, small wooden plaques or small granite slabs. Unlike lasers driven with linear motors, galvo mirror-driven systems lack the laser power to process relatively large parts. As with linear-motor driven lasers, the operation of galvo mirror-systems is too slow to produce building product parts economically.

SUMMARY OF THE INVENTION

A first aspect of the invention is directed to a method of scribing a graphic on a material, in which laser output is applied to the material. The laser output is moved relative to the material at a high speed greater than 10 meters per second, and the laser output has a high power greater than 500 W, to scribe a graphic on a surface of the material.

A second aspect of the invention involves a system for scribing a graphic on a material. The system includes a laser operable at a high power output greater than 500 W, and a mirror system for moving the laser output at a speed greater than 10 meters per second to scribe a graphic on a surface of the material.

A third aspect of the invention is directed to a graphics processing module that efficiently processes the graphic image in order to control positioning of the mirrors to scribe the graphic and control the power of the laser.

Additional aspects of the invention, including additional methods, additional systems, devices, apparatus, articles, and others, will become apparent upon viewing the accompanying drawings and reading the detailed description below.

BRIEF DESCRIPTION OF THE SEVERAL VIEWS OF THE DRAWINGS

The accompanying drawings are incorporated in and constitute a part of the specification. The drawings, together with the general description given above and the detailed description of the exemplary embodiment(s) and method(s) given below, serve to explain the principles of the invention. In such drawings.

DETAILED DESCRIPTION OF EXEMPLARY EMBODIMENT(S) AND EXEMPLARY METHOD(S)

Figure 1:
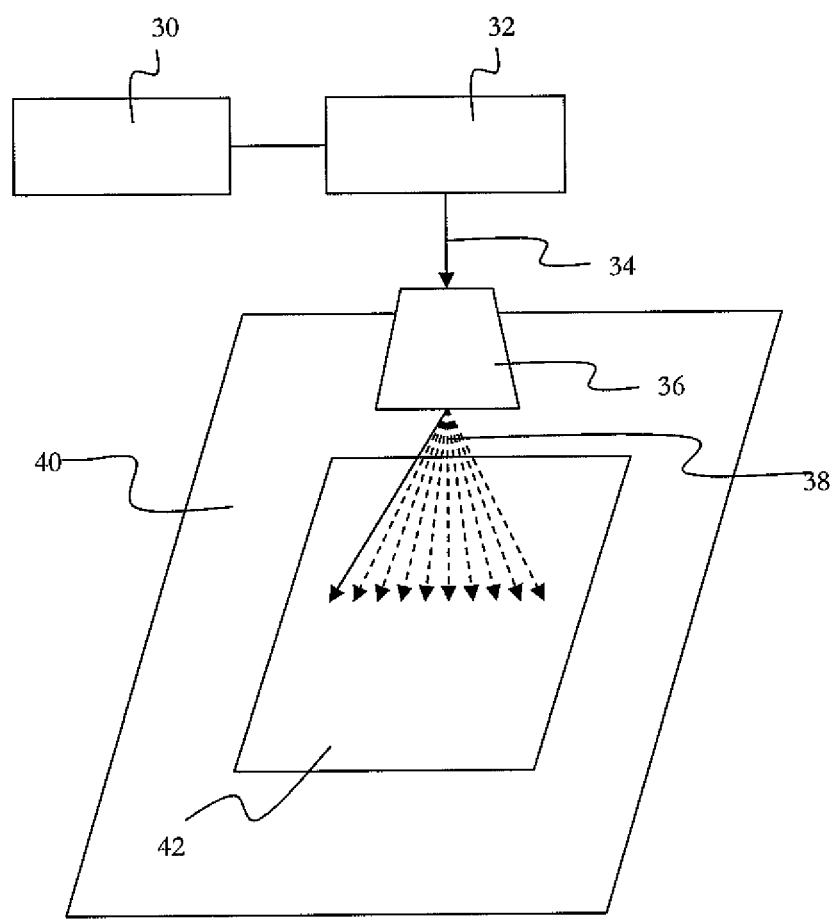
FIG. 1 is a schematic view of a system for scribing a graphic on a material according to an embodiment of the invention.

Reference will now be made in detail to exemplary embodiment(s) and method(s) of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this detailed description section.

The inventors know of no one who has suggested high speed engraving processing with high-power lasers prior to this invention. The inventors have determined that lasers using high power (greater than 500 watts) and high speed (greater than 10 meters per second) would be a significant improvement to conventional systems and a commercially reasonable way to lase graphics and patterns on building product substrates and other materials in mass production to achieve low unit costs and thus satisfactory economics.

In particular exemplary embodiments, 2,000 watt or higher, and even 2,500 watt or higher lasers coupled to ultra high speed scan heads capable of 30 meters per second or greater speeds offer attractive unit manufacturing costs and economics. The inventors have calculated that laser scan speeds of 30-50 meters per second can etch graphic patterns in time frames measured in seconds per square foot and unit costs measured in pennies per square foot. As referred to herein, "speed" is the speed of the laser output (e.g., beam) relative to the surface of the material. Relative speed may be imparted by moving the laser output while maintaining the material stationary, or by moving the material while maintaining the laser output stationary, or by simultaneously moving the laser output and material in different directions and/or at different rates.

According to an exemplary embodiment, a high-speed high power laser is used to form graphics and patterns on a building material substrate. The laser, represented by reference numeral 32 in FIG. 1, is a high power laser having greater than 500 W of output power, and in certain exemplary embodiments greater than a 1000 W (1 kW), 2000 W (2 kW) or even greater than 2500 W (2.5 kW). The laser power output referred to herein is continuous, as distinguished from the power output when a laser has a temporary energy surge, or when the laser is pulsed. The continuous power can be varied by adjusting the power setting on the laser. The laser frequency is typically in the range of, for example, 10 to 60 kHz. An exemplary commercial laser is available from Rofin-Sinar Technologies, Inc. 2.5 kW $CO_2$ laser, model number DC025.

The output 34 of the laser 32 is coupled to a scanning head 36, which includes a controllable, movable relatively light weight coated mirror that is capable of scanning the laser output at a relatively high speed. In exemplary embodiments the speeds are greater than 10 m per second, or even 30 m per second or higher with higher power lasers. As described herein, scan speeds of up to 65 m per second or even higher may be employed. Moreover, the laser output 38 can be scanned across the work piece on working surface 40, as shown in FIG. 1. For example, the output 38 may scan lengths of 0.9 m (3 feet) or more.

Laser systems according to this embodiment use very high scan speeds in order to achieve low unit cost in processing materials, such as structural and decorative building materials. Examples of materials that may be treated using the systems and methods embodied herein include glass (tempered glass and/or annealed glass), stone, ceramic, granite, engineered wood, laminates, metal, plastic, gypsum, siding, fiberglass reinforced plastic, wood composites, vinyl, acrylic, hardboard, veneer, low profile carpet tiles, etc. Lasers that scan at such high speeds according to embodiments of the invention employ exceptional power to provide high energy density per unit time for satisfactorily etching graphics on building materials and other substrates at industrial production levels. At laser powers below 500 watts, a laser operating at high scan speed of 30-50 meters per second would simply not have sufficient power to effectively etch graphic images on building products.

In order to provide a laser system with 1,000-2,500 watts that is galvo driven at high scan speeds, e.g., ranging from 30-50 meters/second, in an exemplary embodiment of the invention lightweight high technology mirror systems with high temperature coatings as commercially available are used. An exemplary commercially available lightweight high technology mirror system is ScanLab AG, Model PowerSCAN33 Be, 3-axis Galvanometer scanner with 33 mm Be Mirrors. The high temperature coating is believed to be a physical vapor deposited alloy. The lightweight beryllium substrate is coated with materials allowing the mirror surface to reflect over 98% of the $CO_2$ wavelength, 10.6 microns. The lightweight high technology mirror systems allow the galvanometers (or "galvos" for short) to move the laser output (e.g., beam) in a repeatable but efficient fashion over the substrate surface. The scan speed of such a laser system is surprisingly an order of magnitude higher than the laser scan speeds achieved with either linear drives or conventional galvo mirrors. Using such a lightweight mirror system, the inventors have achieved laser scan speeds in excess of 65 meters per second compared to maximum scan speeds of 4-5 meters per second with conventional laser engraving technology.

The system includes a controller, designated by reference numeral 30 in FIG. 1, which is capable of keeping up with the ultra high scan speeds produced by the lightweight mirrors and making the necessary power changes at the specified speed. To create fine resolution graphics, the controller makes those power changes at high rates, such as every few millimeters of beam scan. The scan speed of the laser will determine the amount of power changes within the graphic. The type (e.g., complexity and intricacy) and depth of the graphic will also influence how it is scribed on the substrate. An exemplary commercially available controller is the Model Foresight Controller, Embedded Laser Process Controller available through LasX Industries, Inc. The interdependence of power changes, controller speed, and laser scan speed is illustrated in Tables II and III below.

Figure 2:
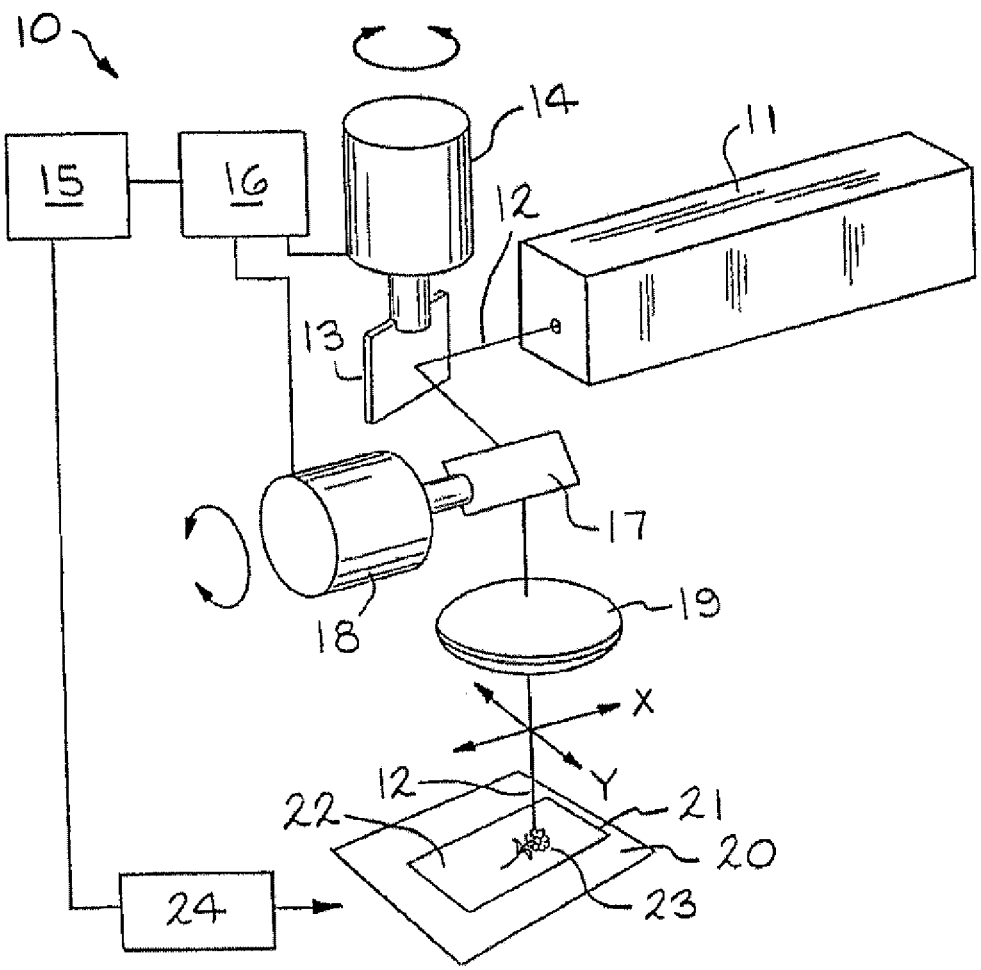
FIG. 2 is a schematic view of a system for scribing a graphic on a material according to another embodiment of the invention.

FIG. 2 illustrates another embodiment of a system for scribing materials, such as building materials. The system, generally designated by reference numeral 10, includes a laser 11 for generating a laser beam 12 in a direction of a computer-controlled mirror system.

The illustrated mirror system includes an x-axis mirror 13 rotatably mounted on and driven by an x-axis galvanometer 14. The x-axis galvanometer 14 is adapted to rotate and cause the rotation of the x-axis mirror 13. Rotation of the x-axis mirror 13 while the laser beam 12 is incident on the mirror 13 causes the laser beam 12 to move along the x-axis. A (numerical) control computer 15 controls the output of a power source 16 to control the x-axis galvanometer's 14 rotation of the x-axis mirror 13. The laser beam 12 is deflected by the x-axis mirror 13 and directed toward a y-axis mirror 17 rotatably mounted on y-axis galvanometer 18. The y-axis galvanometer 18 is adapted to rotate and cause rotation of the y-axis mirror 17. Rotation of the y-axis mirror 17 causes movement of the laser beam 12 incident on mirror 17 along the y-axis. The control computer 15 controls the output of the power source 16 delivered to y-axis galvanometer 18 for controlling rotation of the y-axis galvanometer 18.

The laser beam 12 is deflected by the y-axis mirror 17 and directed through a focusing lens 19 adapted to focus the laser beam 12. The lens 19 may be a multi-element flat-field focusing lens assembly, which optically maintains the focused spot on a flat plane as the laser beam 12 moves across the material to scribe a graphic. The lens 19, mirrors 13, 17 and galvanometers 14, 18 can be housed in a galvanometer block (not shown).

The apparatus 10 further includes a working surface 20 which can be a solid substrate such as a table, or even a fluidized bed. A material (or work piece) 21 is placed on the working surface 20. The material 21 includes a working surface 22 to be scribed. The working surface 20 can be adjusted vertically to adjust the distance from the lens 19 to the surface 22 of the material 21. The laser beam 12 is directed by the mirrors 13, 17 against the working surface 22 of the material 21. Usually the laser beam 12 is directed generally perpendicular to the working surface 22, but different graphics can be achieved by adjusting the angle between the laser beam 12 and the working surface 22 from about 45° to about 135°. Relative movement between the laser beam 12 in contact with the working surface 22 of the material 21 causes a graphic 23 to be scribed on the surface 22. The movements and timing of the mirrors 13, 17 and the power of the laser beam 12 are controlled by the numerical control computer 15 to scribe the specific desired graphic 23. As referred to herein, relative movement may involve movement of the laser beam 12 (e.g., using the mirror system) as the working surface 22 remains stationary, movement of the working surface 22 while the laser beam 12 remains stationary, or a combination of simultaneous movement of the laser beam 12 and the working surface 22 in different directions and/or at different speeds.

A second computer such as a work station computer (not shown) can be used in the method to facilitate the formation of the desired graphic. For example, a graphic can be scanned into the work station computer, converted into the proper format, and then introduced into the control computer. The numerical control computer then controls the galvanometers 14, 18 and mirrors 13, 17 and the power output of the laser beam 12 to form the graphic on the surface of the material 22 at the appropriate power and movement velocity for high throughput.

The system 10 can also include a tank 24 to inject a gas such as an inert gas into the working zone. The amount of gas can be controlled by the numerical control computer or by other means.

The term scribe, as used herein, means to contact the material with a laser beam to form a graphic. In the course of scribing, the laser beam 12 applies power to the substrate, thereby causing a visually perceptible change to the substrate, such as by causing removal of a coating of the substrate, removal of substrate material, etc. The result is a transformation of the substrate that is visually perceptible. The term graphic refers to decorative and artistic designs, non-decorative designs, patterns, graphic images, looks, alpha-numeric characters, logos, other identification, etc.

Two technologies of laser scribing graphics on materials include raster and vector technologies. Raster technology can be defined as the laser drawing of a graphic either in the horizontal or vertical direction by scanning back and forth in a continuous manner until the graphic is finished. Vector drawing can be defined as the laser outlining each individual part of the graphic until the entire graphic is complete.

The amount of laser power needed to provide an acceptable design at a high speed will be determined by the nature of the substrate. The laser power may range anywhere above 500 watts, and as high as, for example, 5,000 watts. For example, the power needed to lase on cotton shirts or silk at high scan speeds might require only 500 watts, whereas it might take a much higher power, such as 2,500 watts or greater to efficiently lase on plastic lumber, engineered wood or denim at similar scan speeds. This concept may also apply to smaller size substrates as well, such as for mass customization.

According to an embodiment, control information for controlling the laser may be stored in advance in the controller 30. The stored control information may be linked to one or many different graphics, e.g., patterns.

The inventors have obtained numerous materials and building products including plastic lumber, vinyl siding, wood composites, drywall, laminate products, hardboard, wood fiber products, tempered glass, annealed glass, drywall, vinyl, ceiling tiles, flooring, fiberglass and resin components, carpet tile, and attempted to impart fashion designs on these components using a high speed (greater than 10 meters per second and preferably 30 meters per second) and high laser power (greater than 500 watts, and in certain exemplary embodiments 2,000 watts or greater or as much as 2,500 watts). The experimental results were nothing short of surprising in that in every case the laser was able to impart striking and artistic designs on these products in a matter of seconds. Hence, the techniques disclosed in the embodiments provide, for the first time, an economic breakthrough for laser etching graphic images on building products.

The inventors were surprised with the attractive and intricate graphic designs and textures that could be scribed at high speeds on acrylic, vinyl and fiberglass building product components, plastic lumber, and wood composites. A variety of graphics and wood grain patterns were scribed on these building products in time frames measured in seconds per square foot, Plain "vanilla"-decor products were turned into decorative components in seconds. Oak, walnut, cedar and mahogany wood grain patterns were lased on plastic lumber and wood composites to provide a real wood-simulated deck component. Even exotic wood grain patterns such as leopard wood grain patterns and other floral and graphic patterns were lased on plastic lumber and wood composites at high throughput rates to give striking new designs. Most importantly, such designs were created in such short time frames, that the laser etching process would indeed be economical for large scale production. Graphics lased on drywall added a new degree of freedom to the design aesthetics of interior walls and represented yet another surprise. Lasing different textures on flooring products ranging from hard and soft boards to ceramic tile provided new low cost alternatives to add decoration and design to flooring. Etched graphics and patterns can even be lased on mirrors to provide a totally new mass-produced aesthetically pleasing appearance.

The inventors believe that the laser system embodied herein can provide almost limitless fashion and design features to building products for the first time in an economical production process. The inventors have demonstrated that 2,500 watt lasers driven by galvometric mirrors can indeed decorate building products in seconds and thus are very economical if not revolutionary to the cost structure. To further improve the economics, the products can be laser-scribed at high speeds (e.g., greater than 10 meters per second) and high powers (e.g., greater than 500 watts) while coupled to a simple moving conveyor system. The laser system can "print-on-the-fly" in a continuous laser scribing process. Also, there are several other means to improve the economics, such as: multiple lasers can be put in place along a production line to double or triple throughput; the scan head can be attached to a linear motor that will laser etch a larger material in sections until the entire piece is finished; and the distance from the laser to the working surface can be increased to allow laser etching larger pieces or multiple pieces at once.

For example, laser etching plastic lumber in a continuous process for mass production may involve one 2,500 watt laser directed at a working surface of 50.8 cm (20 inches) that operates at high speeds to match the line speed of the process, But to properly laser etch interior doors for mass production that are some 3 foot by 8 foot in size, it may be more efficient to employ multiple lasers or a linear motor to cover the entire working surface. Regardless of the setup, the inventors have determined that laser powers of 500 or higher (e.g., 500-2,500 watts) and laser scan speeds of 10 meters per second on higher (e.g., from 10-50 meters per second) produce satisfactory economics in unit costs for lasing graphics on building products. The actual unit costs could be reduced from dollars per square foot to cents per square foot by increasing the laser speed from the industry standard 3.8 meters per second to, for example, 50 meters per second.

The power and speeds should be controlled to avoid any undesirably consequences of over-treatment, such as complete carbonization, burn-through and/or melting of the scribed material.

It should be understood that the methods and systems described herein may be used for scribing materials other than building materials. Others materials that may be scribed in accordance with embodiments described herein include denim fabric and leather, such as found in the garment industry.

Computer hardware and software for carrying out the embodiments of the invention described herein may be any kind, e.g., either general purpose, or some specific purpose such as a workstation. The computer may be a Pentium® class computer, running Windows XP®, Windows Vista®, or Linux®, or may be a Macintosh® computer. The computer may also be a handheld computer, such as a FDA, cellphone, or laptop.

The programs may be written in C, or Java, Brew or any other programming language. The programs may be resident on a storage medium, e.g., magnetic or optical, of, e.g., the computer hard drive, a removable disk or media such as a memory stick or SD media, or other removable medium. The programs may also be run over a network, for example, with a server or other machine sending signals to one or more local machines, which allows the local machine(s) to carry out the operations described herein.

EXAMPLES

To demonstrate the influence of substrate material and graphic image pattern on laser power and scan speed, the experiments set forth in Table I below were carried out on various substrates.

TABLE I

| Substrate | Graphic Image | Laser Power (Watts) | Laser Scan Speed (m/s) |
|---|---|---|---|
| PVC Composite | Cedar | 1750 | 10 |
| Polethylene wood composite | Cedar | 2500 | 10 |
| Polyethylene wood composite | Maple | 2000 | 10 |
| Polyethylene wood composite | Leopard | 1750 | 10 |
| Hardboard | Walnut | 2500 | 15 |
| Painted MDF (2 paint layers) | Simple Oak | 2500 | 40 |
| Medium Density Fiberboard (MDF) | Rose Pedals | 2500 | 15 |
| Medium Density Fiberboard (MDF) | Simple Walnut | 1500 | 22 |
| Medium Density Fiberboard (MDF) | Oak Cross Grain | 1500 | 22 |
| Painted Hardboard (2 paint layers) | Maple | 1375 | 15 |
| Painted Hardboard (1 paint layer) | Simple Oak | 2500 | 28 |
| Primed Hardboard | Simple Oak | 2500 | 32 |
| PVC | Cedar | 2500 | 10 |
| Reaction-Injected Molded Plastics | Cedar | 2250 | 10 |

The effects of controller speed on laser power change width for two separate graphic images are demonstrated by Tables II and III below. Table II contains data for 32 laser lines per inch and Table III contains data for 60 laser lines per inch. For example, a graphic image with 32 lines per inch requiring the laser power to change every 2 pixels can achieve a maximum laser span speed of 15 m/s at a controller speed of 10,000 pixels per second (see Table II). In order to double the laser speed to 30 m/s in this instance, the controller should have a processing power of 20,000 pixels per second. As the laser lines per inch increase (comparing Table II to Table III), the controller speed becomes more important for maintaining high laser line speed.

TABLE II

| Specific Graphic at 32 lines/inch | | |
|---|---|---|
| Power Change Width (Pixels) | Controller Speed (Pixels/second) | Laser Scan Speed (m/s) |
| 4 | 10,000 | 31 |
| 4 | 20,000 | 62 |
| 3 | 10,000 | 23 |
| 3 | 20,000 | 46 |
| 2 | 10,000 | 15 |

TABLE II-continued

Specific Graphic at 32 lines/inch

| Power Change Width (Pixels) | Controller Speed (Pixels/second) | Laser Scan Speed (m/s) |
|---|---|---|
| 2 | 20,000 | 30 |
| 1 | 10,000 | 7 |
| 1 | 20,000 | 14 |
| 1 | 40,000 | 28 |
| 1 | 50,000 | 35 |

TABLE III

Specific Graphic at 60 lines/inch

| Power Change Width (Pixels) | Controller Speed (Pixels/second) | Laser Scan Speed (m/s) |
|---|---|---|
| 4 | 10,000 | 16 |
| 4 | 20,000 | 32 |
| 3 | 10,000 | 12 |
| 3 | 20,000 | 24 |
| 2 | 10,000 | 8 |
| 2 | 20,000 | 16 |
| 1 | 10,000 | 4 |
| 1 | 20,000 | 8 |
| 1 | 40,000 | 16 |
| 1 | 50,000 | 20 |

The foregoing detailed description of the certain exemplary embodiments of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Although only a few embodiments have been disclosed in detail above, other embodiments are possible and the inventors intend these to be encompassed within this specification and the scope of the appended claims. The specification describes specific examples to accomplish a more general goal that may be accomplished in another way. Modifications and equivalents will be apparent to practitioners skilled in this art and are encompassed within the spirit and scope of the appended claims and their appropriate equivalents. This disclosure is intended to be exemplary, and the claims are intended to cover any modification or alternative which might be predictable to a person having ordinary skill in the art. For example, other kinds and wattages of lasers, beyond those described above, could be used with this technique.

Claims which use the words "means for" are presumed to be interpreted under 35 USC 112, sixth paragraph, while claims that do not use the words "means for" are presumed not to be interpreted under 35 USC 112, sixth paragraph. No limitations from the specification are to be read into any claims, unless those limitations are expressly included in the claims.

What is claimed is:

1. A method of laser scribing a graphic onto a workpiece, comprising:
    applying control information from a controller operable at a controller speed in a range of 10,000 pixels per second to 50,000 pixels per second to a laser operated to produce a laser beam, and laser scribing a graphic onto a surface of a workpiece with the laser beam based on the control information, said laser scribing comprises moving the laser beam at a relative scan speed in a range of 10 m/s to 50 m/s and lasing the graphic onto the surface of the workpiece while the controller with the control information is operable to change the power output every 1 to 4 pixels without burning through the workpiece, wherein the laser is operable to produce the laser beam with a power output in a range of 500 W to 5000 W.

2. The method of claim 1, wherein the laser is operable to produce the laser beam with the power output in a range of greater than 500 W to 5000 W.

3. The method of claim 1, wherein the controller speed is operable in a range of 20,000 pixels per second to 50,000 pixels per second.

4. The method of claim 1, wherein the relative scan speed is in a range of 30-50 m/s.

5. The method of claim 4, wherein the laser is operated to produce the laser beam with the power output greater than 1000 W.

6. The method of claim 1, wherein said laser scribing further comprises applying the laser beam to the workpiece over a scan length of at least 0.9 m.

7. The method of claim 1, wherein the graphic has a resolution of 32 to 60 laser lines per inch.

8. The method of claim 1, wherein the workpiece comprises a denim workpiece.

9. The method of claim 1, wherein the workpiece comprises a leather workpiece.

10. A method of laser scribing a graphic onto a workpiece, comprising:
    providing a laser operable to produce a laser beam with a power output of at least 500 W for laser scribing a graphic onto a surface of a workpiece based on control information;
    providing a workpiece to be scribed;
    applying control information from a controller operable at a controller speed of at least 10,000 pixels per second to the laser while the laser beam is moved at a speed relative to the surface of the workpiece of at least 10 m/s; and
    laser scribing a graphic onto a surface of a workpiece with the laser beam based on the control information, said laser scribing comprises moving the laser beam at a relative scan speed of at least 10 m/s and lasing the graphic onto the surface of the workpiece without burning through the workpiece.

11. The method of claim 10, wherein the controller with the control information is operable to change the power output every 1 to 4 pixels.

12. The method of claim 10, wherein said lasing the graphic onto the surface of the workpiece comprises operating the controller with the controller using the control information to change the power output every 1 to 4 pixels without burning through the workpiece.

13. The method of claim 10, wherein said lasing the graphic onto the surface of the workpiece comprises operating the controller with the controller using the control information to change the power output every 1 to 4 pixels without burning through the workpiece while operating the laser to produce the laser beam with the power output of at least 500 W.

14. The method of claim 10, wherein said laser scribing is performed with the laser beam having a power output in a range of 500 W to 5000 W.

15. A method of laser scribing a graphic onto a workpiece, comprising:

provingding a laser operable to produce a laser beam with a power output of at least 500 W for laser scribing a graphic onto a surface of a workpiece based on control information;

providing a workpiece to be scribed;

applying control information from a controller operable at a controller speed of 10,000 pixels per second to 50,000 pixels per second to the laser while the laser beam is moved at a speed relative to the surface of the workpiece of at least 10 m/s; and laser scribing a graphic onto a surface of a workpiece with the laser beam based on the control information, said laser scribing comprises moving the laser beam at a relative scan speed of at least 10 m/s and lasing the graphic onto the surface of the workpiece without burning through the workpiece.

16. The method of claim 15, wherein the controller with the control information is operable to change the power output every 1 to 4 pixels.

17. The method of claim 15, wherein said lasing the graphic onto the surface of the workpiece comprises operating the controller with the controller using the control information to change the power output every 1 to 4 pixels without burning through the workpiece.

18. The method of claim 15, wherein said lasing the graphic onto the surface of the workpiece comprises operating the controller with the controller using the control information to change the power output every 1 to 4 pixels without burning through the workpiece while operating the laser to produce the laser beam with the power output in the range of 500 W to 5000 W.

19. The method of claim 15, wherein said laser scribing is performed with the laser beam having a power output in a range of 500 W to 5000 W.

* * * * *